United States Patent [19]

Teramoto et al.

[11] Patent Number: 5,746,471
[45] Date of Patent: May 5, 1998

[54] CORNER PIECE FOR AN AUTOMOBILE

[75] Inventors: Mitsunobu Teramoto, Nagoya; Akira Itou, Aichi-ken, both of Japan

[73] Assignee: Toyoda Gosei Co., Ltd., Aichi, Japan

[21] Appl. No.: 659,679

[22] Filed: Jun. 5, 1996

[30] Foreign Application Priority Data

Jun. 5, 1995 [JP] Japan ................... 7-138186
Jun. 5, 1995 [JP] Japan ................... 7-138196
Jun. 5, 1995 [JP] Japan ................... 7-138206

[51] Int. Cl.$^6$ ........................................ B60J 5/04
[52] U.S. Cl. ....................... 296/146.1; 296/146.2; 296/146.5
[58] Field of Search ................ 296/146.1, 146.2, 296/146.5

[56] References Cited

U.S. PATENT DOCUMENTS 4,605,260  8/1986  Sakakibara et al. ............ 296/146.2
4,790,590  12/1988  Ito et al. .

FOREIGN PATENT DOCUMENTS

404300717 A  10/1992  Japan ................... 296/146.1
404300718 A  10/1992  Japan ................... 296/146.1
405254345 A  10/1993  Japan ................... 296/146.5
6-64445      3/1994   Japan .

*Primary Examiner*—Gary C. Hoge
*Attorney, Agent, or Firm*—Cushman, Darby & Cushman IP Group of Pillsbury, Madison & Sutro LLP

[57] ABSTRACT

A corner piece for an automobile has a resin insert covered partly with a high molecular elastic material. The resin insert has a bracket body portion and a glass run portion molded together as a unit from a synthetic resin. The bracket body and glass run portions have a common channel along their rear side, and the channel is covered with a high molecular elastic material to form a glass run, or it is fitted with a separate glass run. A reinforcing metal insert is embedded in the bottom of the channel between the bracket body portion and the glass run portion. The reinforcing metal insert reinforces a door belt line, so that the corner piece can mount a large and heavy door mirror and can also be expected to be of improved durability.

6 Claims, 6 Drawing Sheets

CORNER PIECE FOR AN AUTOMOBILE

The priority applications, Japanese Patent Application No. Hei 7-138206, Japanese Patent Application No. Hei 7-138196 and Japanese Patent Application No. Hei 7-138186, all filed in Japan on Jun. 5, 1995, are incorporated into the present specification by reference.

BACKGROUND OF THE INVENTION

1. Field of the Invention

This invention relates to a corner piece for an automobile having a resin insert covered with a high molecular elastic material. More particularly, this invention is suitable for a corner piece for an automobile which is required to be relatively strong, such as a door mirror bracket used for mounting a large or heavy door mirror.

2. Description of Related Art

Description will be made with regard to a door mirror bracket (hereinafter referred to as "mirror bracket") as an example of a corner piece, though the invention is not limited to a mirror bracket. It is also applicable to a corner piece for a rear door, etc.

An insert used in a mirror bracket of an automobile has usually been a metal insert made in the manner described below.

A main body with a mounting portion and a glass run portion are separately formed by a press or roll forming from a relatively thick steel sheet (usually 1.2 to 1.6 mm thickness), and are welded together, whereafter nuts, etc. are welded, if required.

Because of the use of a steel sheet having a high specific gravity (iron having a specific gravity of about 8) as mentioned above, the metal insert has been unable to satisfy the recent requirement for an automobile, as being light in weight. And the preparations by a press and welding of the separate parts for the conventional metal insert have added to the time and labor required for its manufacture and have also imposed limitations on the shape of the insert which can be manufactured (making it difficult to obtain a shape suitable for the recently curved surface of an automobile body).

Therefore, there has been proposed a mirror bracket employing a resin insert which can be manufactured easily in a desired shape and in a short time by injection or compression molding, etc. from a synthetic resin, which is likely to satisfy the requirement for an automobile of light weight (see Japanese Patent Publication KOKAI No. Hei 6-64445).

As a result of our study, however, we, the inventors of this invention, have found that a mirror bracket made by covering a resin insert with a high molecular elastic material, such as Nitrile-Butadiene Rubber (NBR) or NBR/Polyvinyl Chloride (PVC) is unlikely to satisfy the standard strength (design strength obtained by multiplying allowable stress by a safety factor) when it is employed for mounting a large and heavy mirror bracket (for example, of the type containing a motor) on an automobile. A problem is also likely to arise in durability as a result of the typical creep characteristics of a synthetic resin.

Figures 1, 2:
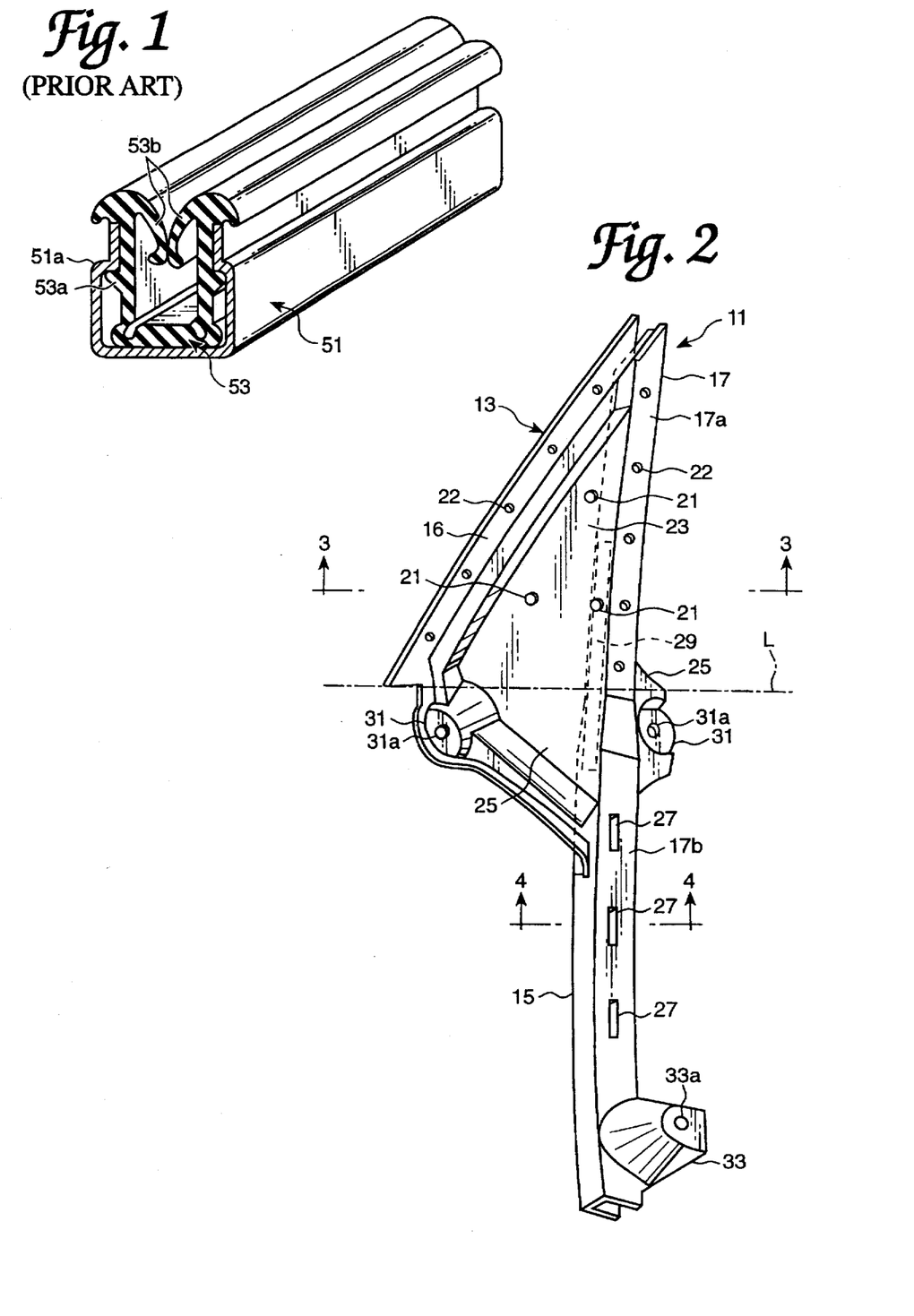
FIG. 1 is a schematic perspective view showing a conventional lower sash of metal and a separate glass run fitted therein.
FIG. 2 is a perspective view of a resin insert in a corner piece according to Embodiment 1 of the invention.

In order to form a glass run portion in a door, it is usually necessary to provide the mirror bracket with a lower sash of metal (a channel forming a glass holder), as shown in FIG. 1.

The lower sash 51 has been formed with an undercut 51a, as shown, when it is formed from metal sheet by using a forming roller. A separate glass run 53 has been filled in the lower sash 51 and held against detachment by a retaining rib 53a formed on the channel-shaped glass run 53 and engaging the undercut 51a. Lips 53b hold a door glass therebetween.

The lower sash 51 is preferably formed as a part of the resin insert in the mirror bracket when the insert is molded. This enhances an improvement in productivity of the resin insert, and reduces the weight of the automobile.

The resin insert as described above is, however, usually required to have the shape of a channel in those portions of the main body of the bracket and the lower sash in which the glass holder (glass run portion) is formed.

In order to form the shape of a channel in a mold, it is necessary to use a sliding core. This is due to the fact that the channel is so shaped as to open in a direction perpendicular to that in which a mold in which the main body of the mirror bracket is formed. Moreover, it may be necessary to employ split sliding cores, depending on the radius of curvature of a door glass as adapted to the recently popular large curvature of the sidewall of an automobile. With sliding cores, the mold becomes undesirably complicated and large.

SUMMARY OF THE INVENTION

Under these circumstances, it is an object of this invention to provide a corner piece (mirror bracket) for an automobile which can be used for mounting a large and heavy corner piece on an automobile, and can also be expected to be of improved durability.

The above object is attained by providing a corner piece for an automobile which is comprised as described below.

The corner piece has a resin insert covered with a high molecular elastic material. The resin insert comprises a bracket body portion and a glass run portion molded together as a unit from a synthetic resin, such as fiber-reinforced plastics (FRP). The bracket body and glass run portions have a continuous channel along their rear side. The channel is covered with a high molecular elastic material to form a glass run, or is fitted with a separate glass run. A reinforcing metal insert is embedded in the bottom of the channel so as to at least bridge the bracket body portion and the glass run portion.

When the corner piece (mirror bracket) is mounted on a door panel, the reinforcing metal insert in the resin insert is positioned at a door belt line. The reinforcing metal insert has a high reinforcing effect, since it has a plane surface in the same direction with the vector of rotation which is produced by the load of a door mirror mounted on the bracket body portion.

Thus, the corner piece of this invention can be attached to an automobile for mounting a large and heavy door mirror, and can be expected to be of improved durability.

It is another object of this invention to provide a corner piece for an automobile which comprises a resin insert having a corner piece portion and a lower sash (or glass run portion) molded together as a unit from a synthetic resin, and covered partly with a high molecular elastic material. Further, the insert can be formed in a simple and small mold without calling for any sliding cores.

The above object is attained by providing a corner piece for an automobile which is comprised as described below.

The corner piece has a resin insert covered partly with a high molecular elastic material. The resin insert has a corner piece portion and a lower sash molded together as a unit from a synthetic resin. The glass run forming portion in the corner piece portion of the resin insert and the lower sash which continues below the glass run forming portion have an L-shaped cross-section formed by cutting away one of the sidewalls of a channel. A glass holding piece is attached to the middle part of the lower sash.

The resin insert in the corner piece can be formed in a simple and small mold without requiring any sliding cores. This is due to the fact that the glass run forming portion in the corner piece portion and the lower sash which continues below it, have an L-shaped cross-section formed by cutting away one of the sidewalls of a channel, and thereby eliminates any undercut in the direction crossing that in which the mold is opened.

DESCRIPTION OF THE PREFERRED EMBODIMENTS

Embodiment 1

FIGS. 2 to 5 show a corner piece such as a door mirror bracket according to Embodiment 1 of the invention.

Figure 3:
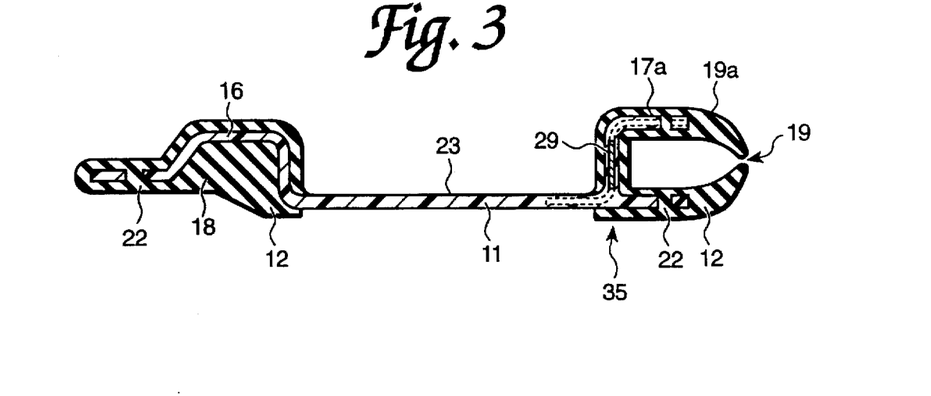
FIG. 3 is a sectional view taken along the line 3—3 of FIG. 2 showing the corner piece including the insert shown in FIG. 2.

The mirror bracket according to this embodiment has a resin insert 11 covered partly with a high molecular elastic material (cover) 12 (FIG. 3).

The resin insert 11 has a bracket body portion 13 and a glass run portion 15 molded together as a unit from a synthetic resin, such as fiber-reinforced plastics (FRP). The bracket body portion 13 and the glass run portion 15 have a common, continuous channel 17 along their rear side. The channel 17 is covered with a high molecular elastic material along at least its upper portion 17a (extending along the bracket body portion) to form a glass run 19 and/or a low portion 17b of the channel 17 is fitted with a separate glass run 20.

More specifically, the bracket body portion 13 is substantially in the shape of a right-angled triangle and its oblique side defines a front pillar seal forming portion 16 having a curved cross-section, while its vertical side has the channel 17. As shown in FIG. 3, the front pillar seal forming portion 16 and the upper channel portion 17a are covered with the high molecular elastic material 12 to form a front pillar seal 18 contacting with a front pillar and an upper glass run portion 19a located above a door belt line L, respectively.

A mirror mounting portion 23, substantially in the shape of a right-angled triangle, has a plurality (three in the drawings) of mirror mounting holes 21 disposed substantially in the center of the triangle.

Figure 7:
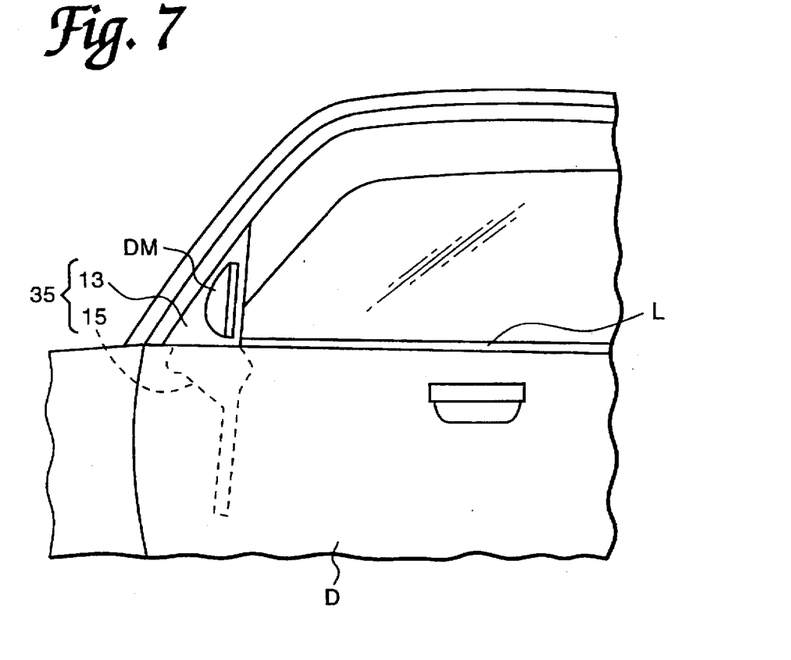
FIG. 7 is a side elevational view of an automobile showing the mounting position of a corner piece.

The glass run portion (lower sash) 15 comprises a connecting portion 25 formed in the shape of an inverted triangle below the bracket body portion 13 and a lower channel portion 17b which continues below the upper channel portion 17a of the bracket body portion 13. The separate glass run (channel type) 20 is fitted in the lower channel portion 17b to form a glass run located below the door belt line L (FIG. 7).

The lower channel portion 17b may alternatively be covered with a high molecular elastic material to form a glass run, as is the case with the upper channel portion 17a of the bracket body portion 13.

The connecting portion 25 in the shape of an inverted triangle is provided at its upper end, or immediately below the door belt line L with two laterally spaced apart outside mounting seats 31, 31 for mounting to a door panel. The lower channel portion 17b is provided at its lower end with an inside mounting seat 33 for mounting to the door panel. Each of the mounting seats 31 and 33 has a mounting bolt hole 31a or 33a therein.

A reinforcing sheet metal insert 29 is embedded in the bottom of the channel 17 so as to at least bridge between the bracket body portion 13 and the glass run portion 15, or across the door belt line L. The sheet metal insert 29 usually has a thickness of 1.0 to 1.7 mm and a length of 80 to 150 mm. The sheet metal insert 29 has a cross-section which is not necessarily shaped like a strip as shown by two-dot chain lines in the drawings. Insert 29 may have an L- or crank-shaped cross-section and may extend toward the outside of the vehicle toward which the door glass is drawn when the vehicle is operating, and/or to the mirror mounting portion to reinforce the respective portions.

The resin insert 11 is formed by injection molding, etc. from a structural rigid resin material, such as ABS, glass fiber-reinforced polypropylene (PP), or polyamide (PA), after the sheet metal insert 29 has been set in the mold.

A mirror bracket 35 is obtained by injection molding the high molecular elastic material on the resin insert 11, and fitting the separate glass run 20 in the channel 17, as stated above. The mirror bracket 35 is attached to the door panel D and a door mirror DM is mounted to the mirror mounting portion 23. (See FIG. 7).

The mirror bracket 35 is sufficiently strong and durable to support even a large door mirror DM. This is due to the fact that the door belt line L forming a fulcrum for a vector of rotation produced by the load of the door mirror DM is reinforced by the reinforcing sheet metal insert 29 having a plane surface in the same direction with the vector of rotation.

Figure 4:
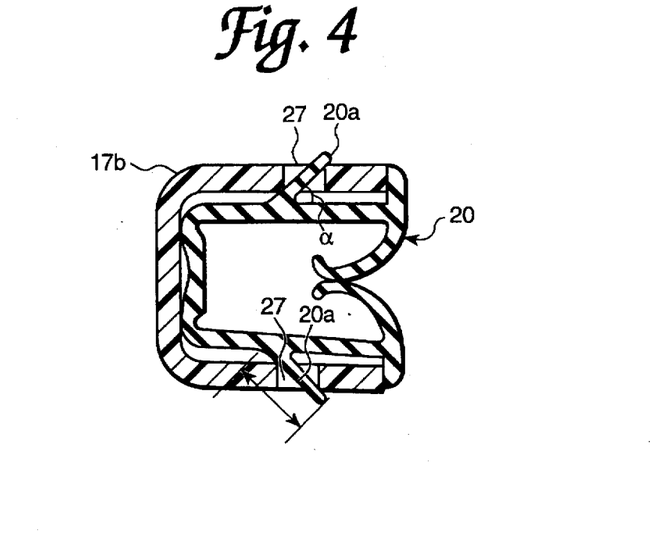
FIG. 4 is a sectional view taken along the line 4—4 of FIG. 2.
Figure 5:
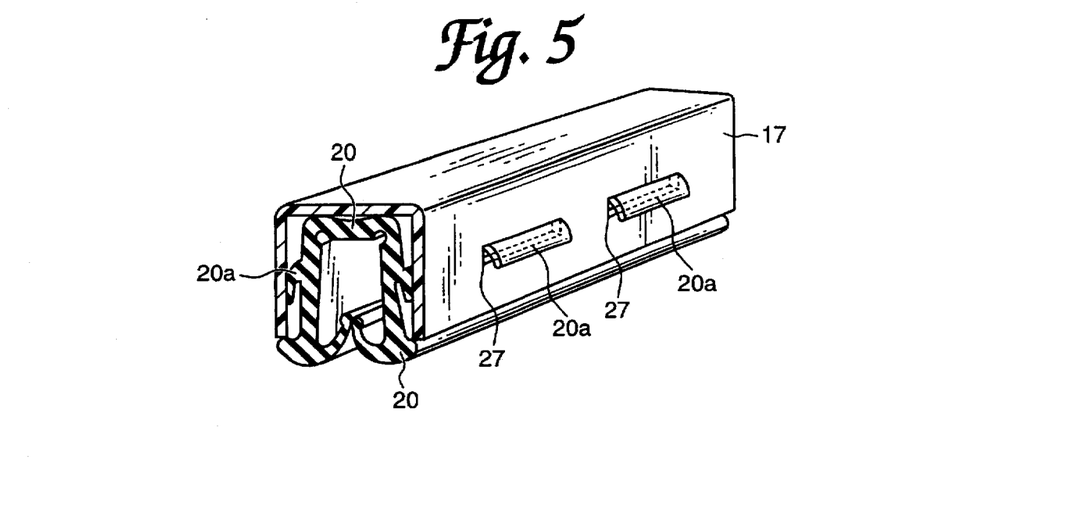
FIG. 5 is a perspective view partially in section, of a glass run portion (or channel-shaped lower sash) of a resin insert as shown in FIG. 4 and a glass run united with it.

The fitting of the glass run 20 in the lower channel portion (channel-shaped lower sash) 17b is preferably carried out so that retaining lips 20a formed on the opposite sides of the channel in the glass run 20 may be engaged in slots 27 formed at appropriate intervals in the lower channel portion 17b, as shown in FIGS. 4 and 5. This is due to the fact that the lower channel portion (channel-shaped lower sash) can easily be formed from a resin in a simple mold, and that it is easily possible to ensure an appropriate force for retaining the glass run 20 after it has been fitted in the lower sash formed from a resin.

According to the embodiment, the lower channel 17b has continuous (FIG. 14) or discontinuous (FIGS. 4, 5) retaining slots 27 formed in its sidewalls, and the glass run 20 is formed on its sidewalls with retaining lips 20a corresponding to the slots 27, so that the lips 20a may be engaged in the slots 27 when the glass run 20 is fitted in the lower channel portion 17b.

Figure 14:
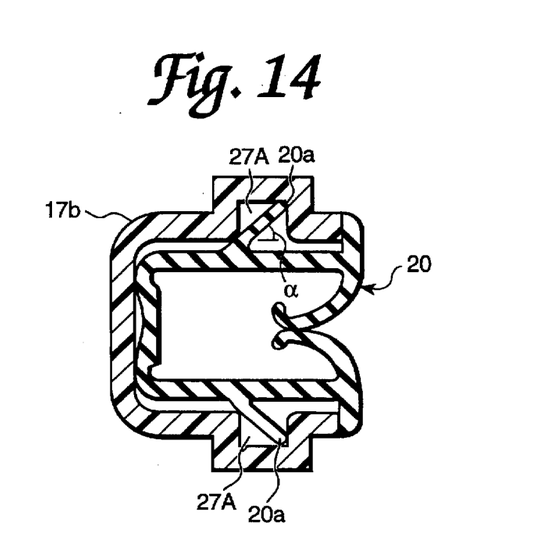
FIG. 14 is a sectional view of an alternative embodiment of the channel portion employing a continuous retaining recess on each of two opposing sidewalls.

Although the retaining slots 27 are shown as being discontinuously formed at appropriate intervals, they may alternatively be continuous and extend along substantially the entire length of the lower channel portion 17b as recesses as shown in FIG. 14.

The slots 27 usually have a width of 3 to 5 mm and the lips 20a have a length, a of 6 to 10 mm, a thickness, t, of 2 to 5 mm and a protruding angle, $\alpha$, of 30 to 60 degrees.

Figure 6:
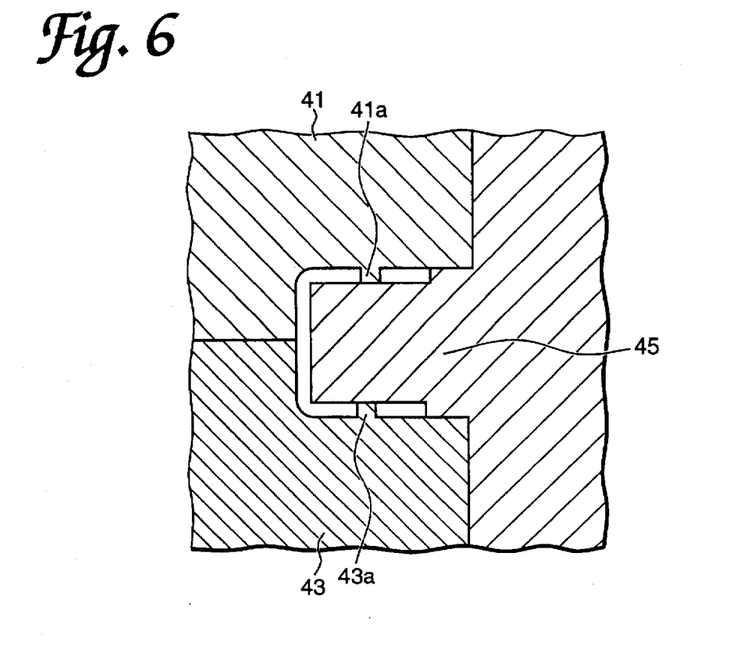
FIG. 6 is a schematic cross-sectional view of a portion of a mold for forming the glass run portion shown in FIG. 5.

The lower channel portion 17b is formed from a rigid resin material, as mentioned above by way of example, by injection molding, etc. employing a mold having a cross-section as shown in FIG. 6.

The mold comprises an upper mold 41, a lower mold 43 and a sliding core 45 which is slidable perpendicularly to the opening direction of the molds to form the cross-section of the channel 17 at its front dead point. The upper and lower molds 41 and 43 have projections 41a and 43a, respectively, for forming the retaining slots 27. The mold construction is simple, since it is sufficient for the sliding core 45 to be slidable along a distance which is slightly longer than the depth of the channel in the lower channel portion 17b.

Embodiment 2

FIGS. 8 to 13 show a mirror bracket according to Embodiment 2.

Figure 8:
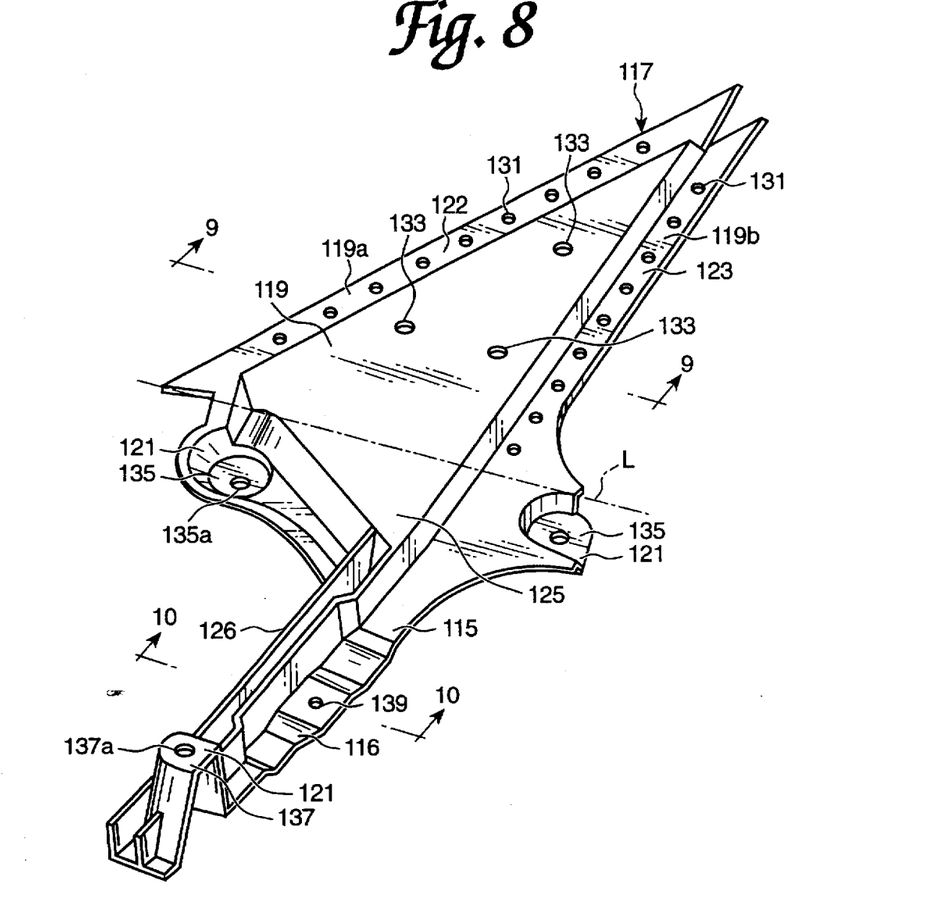
FIG. 8 is a perspective view showing by way of example a resin insert in a corner piece according to Embodiment 2 of the invention (before a glass holding piece is attached)
Figure 12:
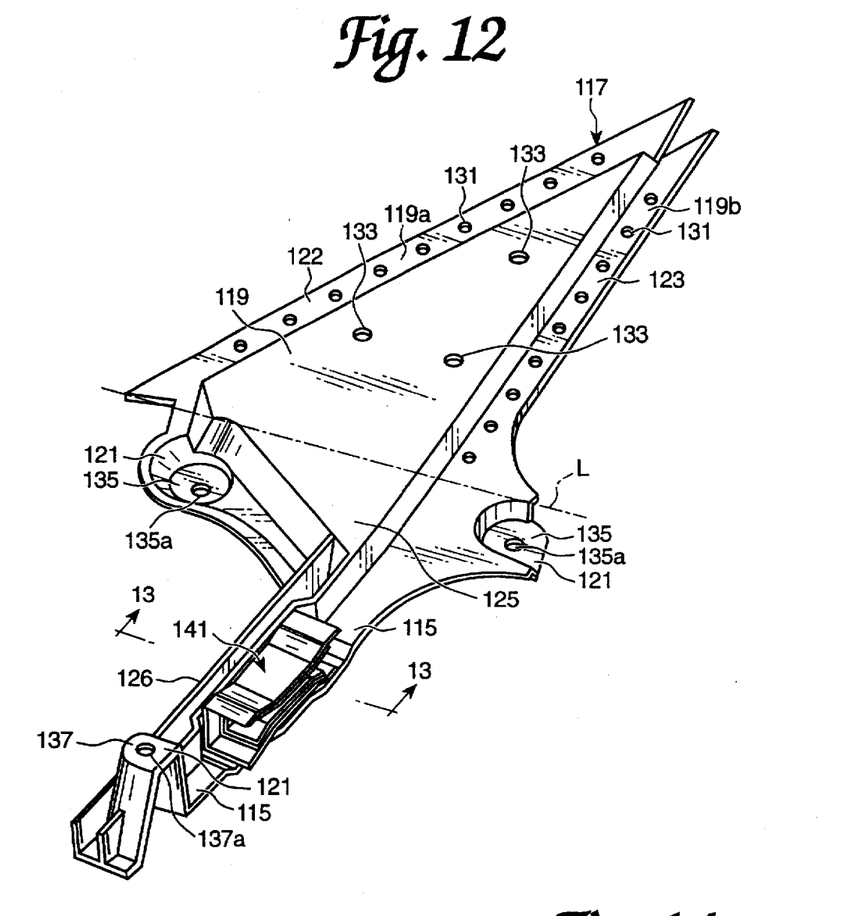
FIG. 12 is a perspective view showing by way of example a resin insert for a corner piece according to the Embodiment 2 (after a glass holding piece is attached)

A resin insert 117 comprises a bracket (or corner-piece) body portion 119 and a lower sash 115 formed together as a unit from a synthetic resin, as shown in FIGS. 8 and 12. More specifically, the bracket body portion 119 is formed in the shape of substantially a right-angled triangle and its oblique side forms a front pillar seal forming portion 122, and its vertical portion is a glass run forming portion 123. A high molecular elastic material M is engaged with the bracket body portion 119 through holes 131.

A plurality (three in the drawings) of mirror mounting holes 133 are formed substantially in the center of the triangle of the bracket body portion 119.

The lower sash 115 comprises a connecting portion 125 in the shape of an inverted triangle and mounting portions 121. The connecting portion 125 is provided at its upper end, or immediately below a door belt line L with two laterally spaced apart outside mounting seats 135 of mounting portions 121 for mounting to a door panel. The lower sash 115, 135 is provided with an inside mounting seat 137 of mounting portion 121 for mounting to the door panel at the low end. Each of the mounting seats 135 and 137 has a mounting bolt hole 135a or 137a therein.

For the synthetic resin, reference is made to the examples thereof given in Embodiment 1.

The glass holder (or glass run) forming portion 123 in the bracket body portion 119 of the resin insert 117 and its lower sash 115 have an L-shaped cross-section formed by cutting away one of the sidewalls of a channel.

In this connection, it is usually preferable to cut away the inner sidewall closer to the interior of the vehicle, while leaving the outer sidewall toward which the door glass is drawn.

The lower sash 115 has substantially in its mid-portion a hole 139 for mounting a glass holding piece 141. In that portion, it also has an uneven surface 116 fitting the surface of one side of the glass holding piece 141 as will be described below.

The lower sash 115 has a reinforcing rib 126 having an L-shaped cross-section and formed on front side, or on its opposite side from the glass holding piece 141. (FIG. 12).

The resin insert 117 does not require any sliding core when it is molded, since its L-shaped cross-section is formed by cutting away one of the sidewalls of the channel extending in a direction crossing that in which a mold for forming the bracket body portion 119 is opened.

Figure 9:
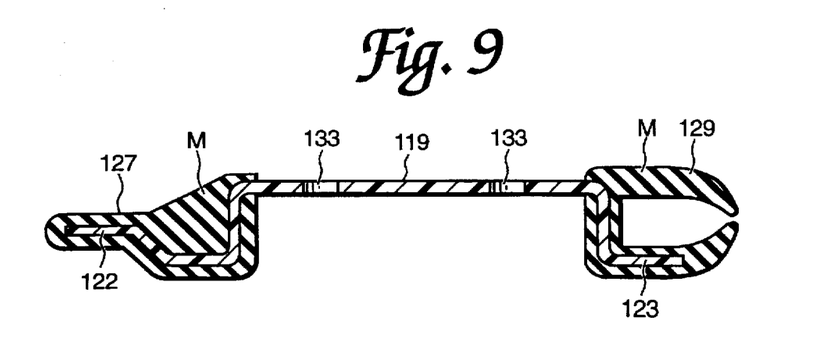
FIG. 9 is a sectional view taken along the line 9—9 of FIG. 8, showing the corner piece including the insert shown in FIG. 8.
Figure 10:
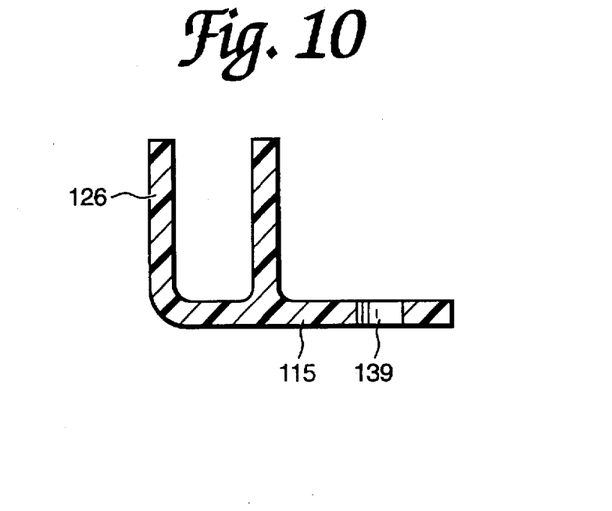
FIG. 10 is a sectional view taken along the line 10—10 of FIG. 8.

The bracket body portion 119 of the resin insert 117 is covered along its oblique side 119a and its vertical side 119b with a high molecular elastic material M, such as NBR/PVC, to form a front pillar seal 127 contacting with a front pillar and a glass run 129, respectively (see FIG. 9).

Figure 11:
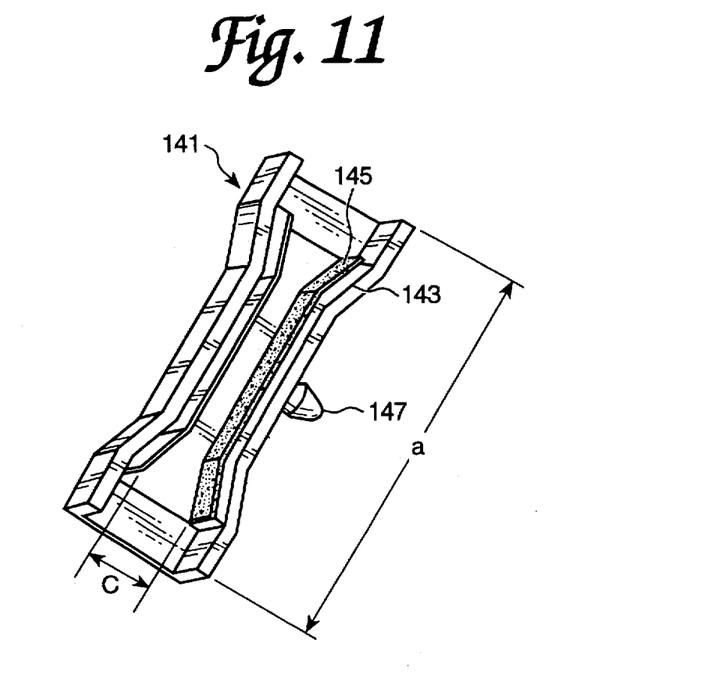
FIG. 11 is a perspective view showing by way of example a glass holding piece for the resin insert according to Embodiment 2 of the invention.
Figure 13:
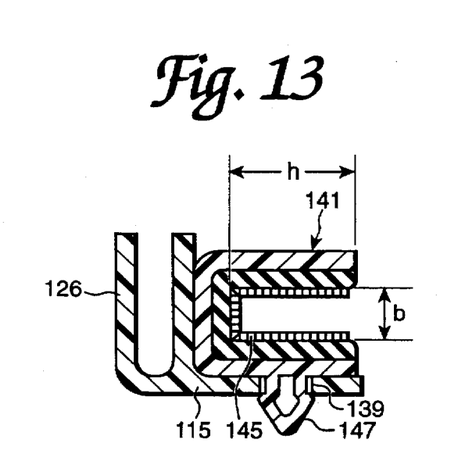
FIG. 13 is a sectional view taken along the line 13—13 of FIG. 12.

The glass holding piece 141 as shown in FIG. 11 is attached to the mid-portion of the lower sash 115 (see FIGS. 12 and 13).

The glass holding piece 141 is in the shape of a channel having an enlarged width at both ends of its length and is lined on both sides with high molecular elastic layer 143 and a glass sliding layer (a layer having flocking piles therein) 145, while outwardly on one side, it has a fastener 147 fitting in the mounting hole 139 formed in the lower sash 115. The high molecular elastic layer 143 is formed from a synthetic rubber, such as NBR, and usually has a thickness of 1 to 3 mm. The glass holding piece 141 is usually formed by injection molding, etc. from a hard synthetic resin, such as fiber-reinforced PP or PA, though it may be of the same material with the resin insert 117.

Although the glass holding piece 141 may extend substantially along the entire length of the lower sash 115, it is often sufficient that it extends along only a part of the length of the lower sash 115, as shown. If such is the case, a single glass holding piece 141 is advantageously sufficient, even if the door glass may have a varying radius of curvature. The glass holding piece 141 usually has an overall length, a, of 30 to 140 mm, and its high molecular elastic layers define a glass holding depth, h, of 1 to 3 mm and has a glass holding clearance, b of 5 to 10 mm and an end clearance, c, of 20 mm therebetween.

While the invention has been described in connection with what is presently considered to be the most practical and preferred embodiments, it is understood that the invention is not limited to the disclosed embodiments but, on the contrary, is intended to cover various modifications and equivalent arrangements included within the spirit and scope of the appended claims.

What is claimed is:

1. A corner piece for an automobile, the corner piece comprising:
 a resin insert having a bracket body portion and a glass run portion molded together as a unit, said bracket body portion and said glass run portion each having a rear side and a common channel extending along the respective rear sides thereof, said channel including a glass run member,
 a high molecular elastic material covering at least a part of the resin insert, and
 a reinforcing metal insert embedded in part of said channel between said bracket body portion and said glass run portion.

2. A corner piece as set forth in claim 1, wherein at least a portion of said channel extending along said glass run portion includes a retaining structure, said glass run member including retaining lips, said lips being engaged with said retaining structure when said glass run member is fitted in said channel.

3. A corner piece as set forth in claim 1, wherein said channel includes side walls and said retaining structure is positioned on side walls of said channel.

4. A corner piece as set forth in claim 2, wherein said retaining structure and said lips are formed in at least the respective sidewalls facing an exterior of an automobile when the corner piece is mounted to the automobile.

5. A corner piece as set forth in claim 3, wherein said retaining structure is in the form of continuous retaining recess for receiving said retaining lips of said glass run member.

6. A corner piece as set forth in claim 3, wherein said retaining structure is in the form of spaced slots defined in said sidewalls for receiving said retaining lips of said glass run member.

* * * * *